3,350,452
PROCESS FOR PREPARING AROMATIC PRIMARY HALOAMINES
Paul N. Rylander, Newark, and Nathan G. Himelstein, Hillside, N.J., assignors to Engelhard Industries, Inc., Newark, N.J., a corporation of Delaware
No Drawing. Filed July 21, 1964, Ser. No. 384,255
10 Claims. (Cl. 260—580)

This invention relates to a process for the catalytic hydrogenation of halo substituted nitroarmomatics to the corresponding haloaromatic amines. More particularly, the invention concerns methods for effecting such hydrogenations while minimizing or avoiding dehalogenation of the aromatic compound.

It is known that nitro substituted aromatic compounds can be effectively reduced to aromatic amines in the presence of various catalysts, including precious metal catalysts. It has been recognized that the catalytic reduction of halogen substituted nitroaromatics poses special problems in view of the fact that the halogen substituent in the aromatic compound is labile to hydrogenolysis, resulting in considerable dehalogenation during the hydrogenation process. Heretofore it has been proposed to use special catalysts, such as rhodium, to effect such reductions to produce aromatic amines while avoiding dehalogenation. The difficulty with rhodium as a catalyst has been the slow rate of reduction encountered with its use, and the art has proposed that activators such as calcium hydroxide be employed to overcome this problem (U.S. 3,051,753).

Prior workers in this field have recognized that platinum is a preferred catalyst for effecting the reduction of halo substituted nitroaromatics to the corresponding amine, but because of the tendency of platinum to promote hydrogenolysis, have resorted to special reaction conditions for avoiding this undesirable side reaction. Thus, U.S. Patent 3,073,865 teaches a process employing platinum on carbon as a catalyst in conjunction with an oxide or hydroxide of magnesium, wherein the catalyst concentration is maintained within narrow and critical limits. When the amount of platinum catalyst is excessive, extensive dehalogenation occurs.

According to the present invention, a novel process has been discovered whereby halogen substituted nitroaromatics can be reduced to the corresponding amine in the presence of a platinum catalyst while minimizing or entirely avoiding hydrogenolysis of the halogen substituent.

It has been found that halogen substituted nitroaromatic compounds can be converted to their corresponding amines by effecting the hydrogenation thereof in the presence of a supported platinum catalyst, wherein the support is selected from the group consisting of barium carbonate and strontium carbonate. While it is well known that the catalytic metal used in a hydrogenation reaction can be critical, even among metals of a particular group of the Periodic Table, generally little is known about the relative merits of various supports for the catalysts, and often the equivalency of catalytic supports is taught or assumed. In accordance with the present invention, barium carbonate and strontium carbonate have been found to be superior to other known supports, e.g. carbon, alumina, calcium carbonate and the like, but the reason for this is not presently known and no explanation is given for the selectivity as shown herein.

The platinum-containing catalysts used in the process of this invention can be prepared by any of the methods known in the art for preparation of finely divided platinum metal on a support. For example, the carrier can be dispersed in an aqueous solution containing a soluble platinum metal compound and the platinum precipitated on the carrier as the oxide or hydroxide. Then the catalyst composite is filtered, washed and dried. The platinum compound can be reduced to the free metal prior to or after washing using known reducing techniques, e.g. by treatment with formaldehyde, hydrogenation, etc. The concentration of catalytic metal on the carrier is not critical, and can be between about 0.1 and about 20% by weight, preferably from about 1–10%. It has been found convenient for exemplary purposes to employ a catalyst containing 5% by weight platinum metal.

In effecting the reduction of halo-substituted nitroaromatics in accordance with the present invention, the catalyst is ordinarily dispersed by stirring in a liquid phase solution of the nitroaromatic dissolved in a suitable solvent. Inert organic liquids are employed as solvent, e.g. hydrocarbons such as benzene, cyclohexane, toluene, and the like, lower aliphatic alcohols including methanol, ethanol, etc., and the choice of solvent is not critical. In certain cases it may be desirable to use the haloaromatic amine product corresponding to the nitric compound to be reduced as the solvent. Generally, varying concentrations of solvent between about 10 to about 90% by weight solvent based on solvent plus reactant weight may be employed.

The hydrogenation reaction is normally effected at temperatures and pressures which favor most efficient conversion with respect to rate of reaction and formation of by-products. Generally, reaction temperatures from about 20° C. to about 150° C., preferably from about 20° C. to about 50° C. are used, and pressures from atmospheric to about 500 p.s.i. Since the undesired hydrogenolysis reaction occurs more readily at high temperatures and pressures, it is preferred to employ the mildest effective reaction conditions within the above ranges. The catalysts of the present invention are particularly effective at atmospheric pressure and ambient temperature.

With respect to catalyst concentration, it has been found that the platinum catalyst supported on barium carbonate or strontium carbonate can be used in much higher concentrations, with respect to nitro compound treated than is possible with related platinum catalysts such as platinum on carbon. The higher permissible concentration of platinum metal thus permits reaction to take place more rapidly (or more effectively under milder conditions than otherwise employed) while providing the advantages of reduced loss of halogen from the aromatic nitro compound. It has been found that the catalysts of the present invention can be effectively employed in amounts between about .001% to about 2% by weight platinum based on aromatic compound reduced, the preferred range of catalyst concentration being between about 0.01% and 1.0%.

The selection of particular reaction conditions, including temperature, pressure and catalyst concentration will vary within the aforesaid limits depending to a certain extent upon the particular halonitroaromatic compound being treated. Thus, the present invention contemplates utilization of a specific catalyst for effecting the reduction of halogen substituted nitro compounds, but the selection of reaction conditions for optimum utilization of the novel catalysts disclosed herein will, as is known in the art, depend upon the liability of the halogen in any particular aromatic compound being treated. Thus it is known that the bromo compounds are in general more prone to hydrogenolysis than the corresponding chloro or fluoro compounds, and those practicing this invention will accordingly employ milder conditions within the ranges taught for the reduction of bromo substituted compounds. Also the selection of reaction conditions will, in a manner known to the art, be governed by the particular position of the halogen and nitro substituents in the aromatic ring.

The process of the present invention can be employed for the production of substantially any aromatic haloamine. For example, haloaniline such as o-chloroaniline, m-bromoaniline, p-fluoroaniline, 2,3-, 2,4- and 3,4-dichloraniline, and the like; haloamino phenols such as 3-bromo-, 3-chloro- or 3-fluoro-4-amino phenol, 2,3-dichloro-4-aminophenol, etc., halobiphenyl amines such as 4-fluoro-, 4-chloro- or 4-bromo-3-biphenylamine; alkylhaloanilines such as 4-chloro-2-aminotoluene, and the like, haloamino phenyl aliphatic acids such as 6-chloro-2-amino benzoic acid, etc. Suitable halo substituted aromatic nitro compounds for the preparation of these and other aromatic amines are set forth in U.S. Patent 3,073,865.

The following examples are provided for a more complete understanding of the invention.

Example 1

A series of experiments was conducted which demonstrate the advantages of the catalyst used in the practice of the present invention. In these tests, the catalyst and halogenated nitroaromatic compound, which in these runs comprised p-chloronitrobenzene, were charged to a standard shaking flask which had been repeatedly evacuated and purged with hydrogen. The system was connected to a gas burette and leveling bulb containing water and the hydrogen uptake was measured by water displacement. The tests were performed at ambient temperature (25° C.) and atmospheric pressure. When no further hydrogen absorption was observed, the product was analyzed for extent of hydrogenolysis by addition of a measured excess of aqueous caustic soda and back-titration with 0.10 N HCl to phenolphthalein end-point to determine ionic halogen produced by hydrogenolysis.

In each run, 200 mg. of catalyst, and 0.01 mol p-chloronitrobenzene dissolved in 20 ml. of ethanol were employed. The results of these tests are shown in Table I.

absorption may be high due to some ring hydrogenation or experimental error, but these results coupled with the titration analysis clearly show that $Pt/BaCO_3$ and $Pt/SrCO_3$ are superior catalysts for the selective reaction. It should be noted that while Pt/C was a good catalyst for hydrogenation without dehalogenation, a considerable amount of ring hydrogenation occurred, indicating that this catalyst is not selective under the test conditions for reduction of the nitro radical to amine.

Example 2

Following the procedure of Example 1, a series of tests were conducted using 5% platinum on strontium carbonate as catalyst for reduction of 0.01 mol p-chloronitrobenzene in 20 ml. ethanol as solvent. The amount of catalyst was varied to determine the effect of catalyst concentration on selectivity. The results are given in Table II.

TABLE II

| Run | Weight Catalyst (5% Pt/$SrCO_3$), mg. | Ml. $H_2$ Absorbed | Time to Completion (Min.) | Percent Dehalogenation by— | |
|---|---|---|---|---|---|
| | | | | $H_2$ Absorption | Titration |
| 16 | 1,000 | 990 | 100 | 105 | 61 |
| 17 | 200 | 810 | 90 | 32 | 10 |
| 18 | 50 | 740 | 130 | 3.2 | 0 |

The data of Table II show that the catalyst loading has a marked effect on the extent of dehalogenation. With suitable ratios of catalyst to nitro compound, dehalogenation can be minimized and even eliminated. While decreased catalyst concentration results in decreased hydrogenation rate, suitable catalyst concentrations can be employed to attain a desirable rate of reaction with a minimum of dehalogenation.

Run 18, in which 50 mg. catalyst was employed, provided a weight ratio of p-chloronitrobenzene to platinum of 630:1 which is a far greater platinum metal concentration than has heretofore been through practicable without excessive dehalogenation.

Example 3

Following the procedure of Example 1, a series of experiments was performed in which various halogen substituted nitroaromatics were hydrogenated at 25° C.

TABLE I.—HYDROGENATION OF p-CHLORONITROBENZENE

| Run | Catalyst | Ml. $H_2$ absorbed | Approx. Time to Completion (Min.) | Percent Dehalogenation[1] by $H_2$ Absorption | Percent Dehalogenation by Titration |
|---|---|---|---|---|---|
| 1 | 5% Pd/C | 985 | 50 | 100 | 100 |
| 2 | 5% Pt/C | 880 | 105 | 61 | 17 |
| 3 | 5% Pt/C | 900 | 110 | 68 | 20 |
| 4 | 5% Rh/C | 830 | 150 | 40 | 36 |
| 5 | 5% Pt/$Al_2O_3$ | 930 | 85 | 81 | 78 |
| 6 | 5% Pt/$BaSO_4$ | 920 | 145 | 77 | 63 |
| 7 | 5% Pt/$CaCO_3$ | 940 | 120 | 85 | 53 |
| 8 | 5% Pt/$SrCO_3$ | 790 | 110 | 24 | 13 |
| 9 | 5% Pt/$SrCO_3$ | 810 | 90 | 32 | 9 |
| 10 | 5% Pt/Kieselguhr | 800 | 95 | 28 | 34 |
| 11 | 5% Pt/$BaCO_3$[2] | 797 | 95 | 27 | 9 |
| 12 | 5% Pt/$BaCO_3$ | 775 | 80 | 18 | 16 |
| 13 | 5% Pd/$BaCO_3$ | 935 | 110 | 83 | 65 |
| 14 | 5% Pd/$SrCO_3$ | 885 | 115 | 63 | 61 |
| 15 | 5% Pd/$CaCO_3$ | 880 | 75 | 61 | 64 |

[1] These values determined on the basis that 732 ml. $H_2$ (at room temperature) is required for reduction of 0.01 mol p-chloronitrobenzene to the haloamine, and 976 ml. $H_2$ required for reduction of 0.01 mol p-chloronitrobenzene to aniline. Accordingly, percent dehalogenation = $\frac{\text{ml. } H_2 \text{ absorbed} - 732}{244} \times 100$.

[2] Double quantities of substrate and catalyst used. $H_2$ absorption divided by 2 to give comparison in Table I.

From the data in Table I it can be seen that $Pt/BaCO_3$ and $Pt/SrCO_3$ were the most selective of the catalysts tested for the reduction of the nitro radical without dehalogenation. The calculated results based on hydrogen and atmospheric pressure employing 5% platinum on barium carbonate and 5% platinum on strontium carbonate as catalyst. In each case, the reaction was effected until absorption of hydrogen had substantially ceased, and the amount of hydrogenolysis determined by titration. The results are given in Table III for hydrogenation employing 200 mg. catalyst, 0.01 mol nitro compound and 20 ml. ethanol as solvent.

TABLE III

| Run | Nitro Compound | Percent Dehalogenation | |
|---|---|---|---|
| | | 5% Pt/BaCO₃ | 5% Pt/SrCO₃ |
| 19 | m-Chloronitrobenzene | 0 | 5 |
| 20 | o-Chloronitrobenzene | 0 | 0 |
| 21 | 4-chloro-2-nitrotoluene | 0 | 0 |
| 22 | p-Bromonitrobenzene | 22 | 19 |

The results of Table III show that Pt/BaCO₃ and Pt/SrCO₃ are effective for the reduction of halonitrobenzenes to haloanilines with a minimum or no dehalogenation. Even the very easily dehalogenated bromo-substituted nitrobenzene (Run 22) shows a minimum of dehalogenation with these catalysts. When para-bromonitrobenzene was hydrogenated under the same conditions employing 5% Pt on carbon and 5% Pt on activated alumina as carriers, the amount of dehalogenation (by titration) was 40% and 78% respectively.

What is claimed is:

1. A method for producing a compound of the formula

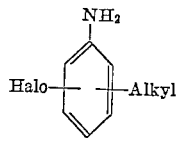

which comprises hydrogenating the corresponding nitro compound at a temperature of about 20° C. to about 150° C. and a pressure between atmospheric and about 500 p.s.i. with a catalyst consisting essentially of platinum supported upon a carrier selected from the group consisting of barium carbonate and strontium carbonate.

2. The method of claim 1 wherein the catalyst is employed in an amount to provide between about .001% to about 2% by weight platinum based on said nitro compound.

3. The method of claim 1 wherein the supported catalyst contains between about 0.1 and about 20% by weight platinum.

4. The method of claim 1 wherein halo represents chloro.

5. The method of claim 4 wherein the compound is p-chloroaniline.

6. The method of claim 4 wherein the compound is m-chloroaniline.

7. The method of claim 4 wherein the compound is o-chloroaniline.

8. The method of claim 1 wherein halo represents bromo.

9. The method of claim 8 wherein the compound is p-bromoaniline.

10. The method of claim 1 wherein the reaction is effected at ambient temperature and atmospheric pressure.

References Cited

UNITED STATES PATENTS

| 2,772,313 | 11/1956 | Trager | 260—580 |
| 3,067,253 | 12/1962 | Dietzler et al. | 260—580 XR |
| 3,073,865 | 1/1963 | Spiegler | 260—580 |

CHARLES B. PARKER, *Primary Examiner.*

R. V. HINES, *Assistant Examiner.*